P. G. HOWE.
MOTOR VEHICLE GEARING.
APPLICATION FILED MAR. 2, 1920.

1,363,875.

Patented Dec. 28, 1920.

UNITED STATES PATENT OFFICE.

PERLEY G. HOWE, OF ANDERSON, INDIANA.

MOTOR-VEHICLE GEARING.

1,363,875.                Specification of Letters Patent.    Patented Dec. 28, 1920.

Application filed March 2, 1920. Serial No. 362,865.

*To all whom it may concern:*

Be it known that I, PERLEY G. HOWE, a citizen of the United States of America, and a resident of Anderson, county of Madison, and State of Indiana, have invented certain new and useful Improvements in Motor-Vehicle Gearing, of which the following is a full and clear specification.

This invention relates to a simple supplemental gearing which may be applied to a motor vehicle of the shaft-driven type and be utilized not only as a low-speed drive for the vehicle, but also as a means for driving auxiliary machinery or apparatus. This supplemental gearing is covered by my former Patent No. 1,274,417, dated Aug. 6, 1918, and the object of the present improvement is to provide simple means whereby the driving-pinion may be readily shifted from one position to another without undue wear or binding or any tendency to be dislocated from its adjusted position, as more fully hereinafter set forth.

In the drawing—

Fig. 2 is a vertical section taken at right-angles to the line on which Fig. 1 is taken.

Figure 1:
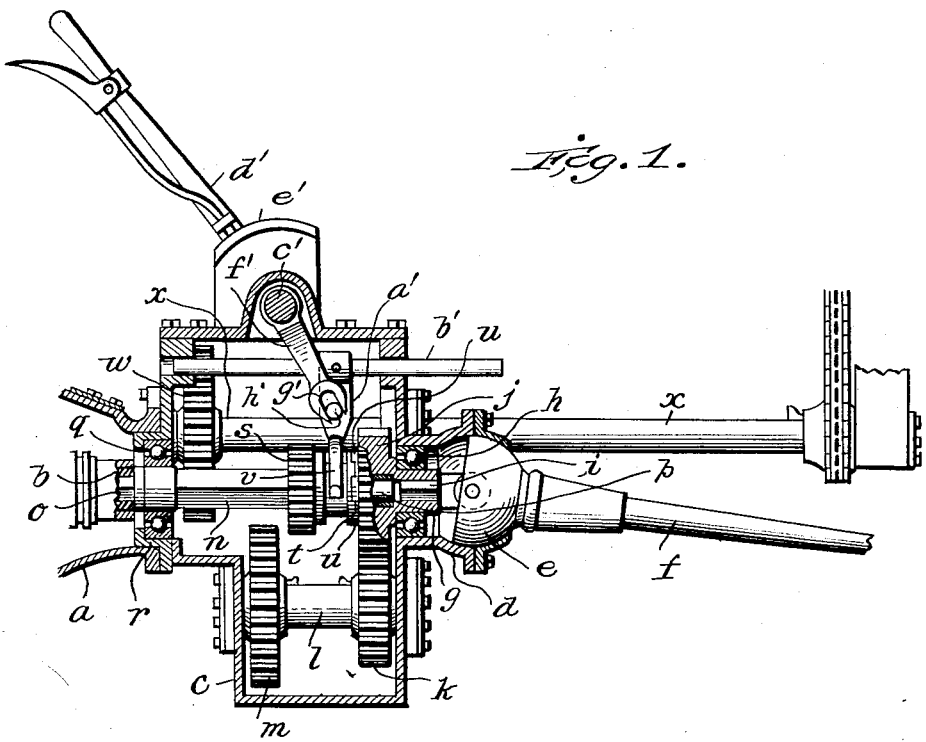
Figure 1 is a vertical sectional view of the preferred form of my gearing, showing it applied to a motor vehicle of the "Ford" type.
Figure 2:
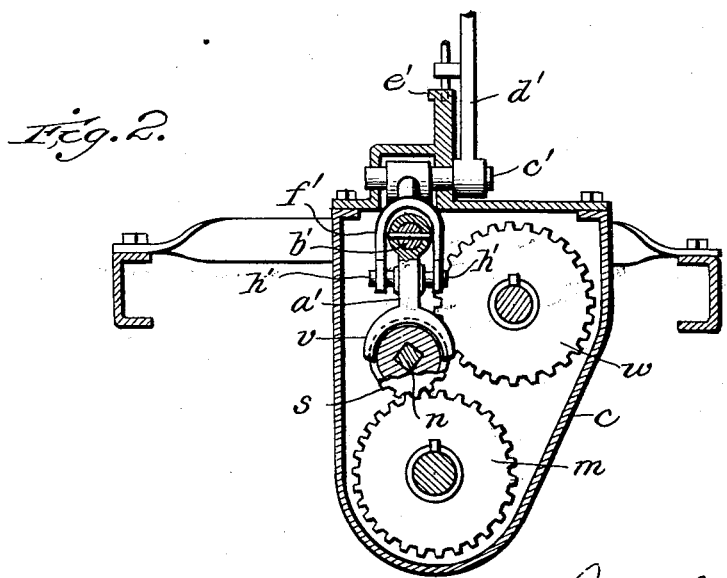

In the drawing, $a$ designates the rear end of the usual transmission case of the automobile motor for driving the vehicle and which contains variable speed driving mechanism of the usual type, the rear end of the main driven shaft of the transmission being illustrated at $b$ in the drawing, this rear end being, as usual, provided with a squared socket for connection with the usual propeller-shaft of the vehicle.

Affixed to the rear end of the transmission case is a casing $c$, upon the rear wall of which is mounted the bearing $d$ of the usual universal joint $e$ of the propeller-shaft $f$ of the vehicle. Connected to the inner or forward half of the universal joint is a short shaft $g$ which is journaled in a ball-bearing $h$ mounted on the rear wall of the casing $c$. This short shaft $g$ is provided with a squared socket in which fits the squared end $i$ of the forward end of the propeller-shaft, and on the inner end of the short shaft $g$ is carried a gear $j$. This gear $j$ meshes at all times with a gear $k$ affixed to a horizontal counter-shaft $l$ which carries at its forward end another gear $m$.

Extending from the transmission shaft $b$ to the short shaft $g$ is an intermediate short shaft $n$, the forward end of this shaft $n$ being provided with a squared end $o$ which fits into the similarly shaped socket of the transmission shaft. The rear end $p$ of the shaft $n$ is journaled in an axial passage in the shaft $g$. The forward end of the shaft $n$ is supported on a ball-bearing $q$ mounted in the front wall of the casing $c$, this front wall being provided with a tubular extension $r$ which fits within the rear end of the transmission case $a$. Slidingly but non-rotatively mounted on shaft $n$ is a pinion $s$, on the rear face of which is a clutch member $t$ which is adapted to interlock with a clutch member $u$ fixed on the forward face of the gear $j$. The pinion is adapted to be shifted back and forth on the shaft $n$ by means hereinafter described.

It will be observed that the intermediate shaft $n$ is adapted to be driven at variable speeds by means of the usual variable-speed mechanism in the transmission and that when the clutch members $t$ and $u$ are interlocked the propeller-shaft of the vehicle will be driven in the usual manner and be subject to the usual variation in speed from the transmission mechanism. When the propeller-shaft is thus driven, the gears $k$ and $m$ rotate idly, but, by disconnecting the clutch $t$—$u$ and meshing the gear $s$ with the gear $m$, it will be seen that the propeller-shaft is driven through the gears $m$, $k$ and $j$ at a reduced speed, the reduction being determined by the ratio of the gears. In this way, a reduction in the vehicle-driving mechanism is obtained that is supplemental to the reduction that may be obtained by means of the transmission alone, and, when this supplemental reducing gearing is employed an important advantage is that the transmission may in many cases be run in high speed, thus materially increasing the efficiency of the vehicle drive, it being well known that, especially in the "Ford" type of vehicle, the efficiency of the motor plant is maintained at a higher degree while running on the high speed of the transmission.

By sliding the gear $s$ along the shaft $n$ to a point forward of the gear $m$ and out of mesh therewith, the gear $s$ may be brought into mesh with a gear $w$ affixed to a supplemental shaft $x$ journaled in the casing $c$ and adapted to be utilized for driving any suitable appliance or mechanism other than the vehicle-wheel-driving devices, such, for instance, as a pump or other apparatus carried by the vehicle or mechanism located adjacent the vehicle. It will be seen that this auxiliary power-shaft $x$ may be driven at varying speeds from the usual transmission of the vehicle, it being an essential characteristic of this invention to thus utilize the transmission to variably drive this shaft $x$.

The present improvements relate to the means for shifting the drive-ponion $s$ into either one of its three positions. The hub of the drive-pinion $s$ is provided with an annular groove on the side adjacent to the clutch; fitting into this groove is the forked lower end $v$ of a vertical bar $a'$ whose upper end is pinned rigidly to a sliding rod $b'$ slidably mounted in openings in the front and rear walls of the casing $c$, this rod being adapted to slide in a plane parallel with the axis of the squared shaft $n$.

In the upper part of the casing is journaled a horizontal pivot $c'$ of a lever $d'$, this lever being provided with a suitable hand-operated bolt for engagement with any one of three notches in a segment $e'$, so that the lever may be locked in any one of its three positions. Fastened to the pivotal part $c'$ is a depending fork $f'$ which straddles the rod $b'$ and upright bar $a'$ and has its lower ends slotted at $g'$ to engage over pins $h'$ projecting horizontally in opposite directions from the upright bar $a'$ at a point about midway its length. It will be observed that by means of the yoke $f'$ and its operating lever, the bar $a'$ may be moved back and forth, to thus slide the drive-pinion along the squared shaft $n$ to any one of its three positions. This construction insures a smooth even movement of the drive-pinion, eliminating all binding of the parts as well as tendency to dislocate or shift the pinion from any one of its adjusted positions. A feature of importance lies in maintaining the yoke $v$ and its carrying-bar $a'$ at all times at exactly right-angles to the axis of the pinion-drive-shaft $n$, so that no matter what position the drive-pinion may be adjusted to there is no binding of any of the parts during the operation of the gearing.

The nature and scope of the invention having been thus indicated and its preferred embodiment having been specifically described, what is claimed as new is:

In a gearing of substantially the type set forth, a drive pinion slidably mounted on the drive-shaft and having a grooved hub, a member provided with a fork which engages said groove, a rod to which said member is affixed at its upper end, said rod being slidably mounted in the casing and being provided about midway its length with oppositely extending bearing pins, and a manually-operable lever mounted on the casing and carrying a fork which straddles said rod and said member and is provided at its extremities with slots which engage said pins.

In testimony whereof I hereunto affix my signature.

PERLEY G. HOWE.

Witnesses:
FRANK MATTHEWS.
B. J. C. HOWE.